Sept. 2, 1969  M. O. JOHNSON  3,464,739
DUAL TRACTOR TIRE ATTACHMENT
Filed May 8, 1967
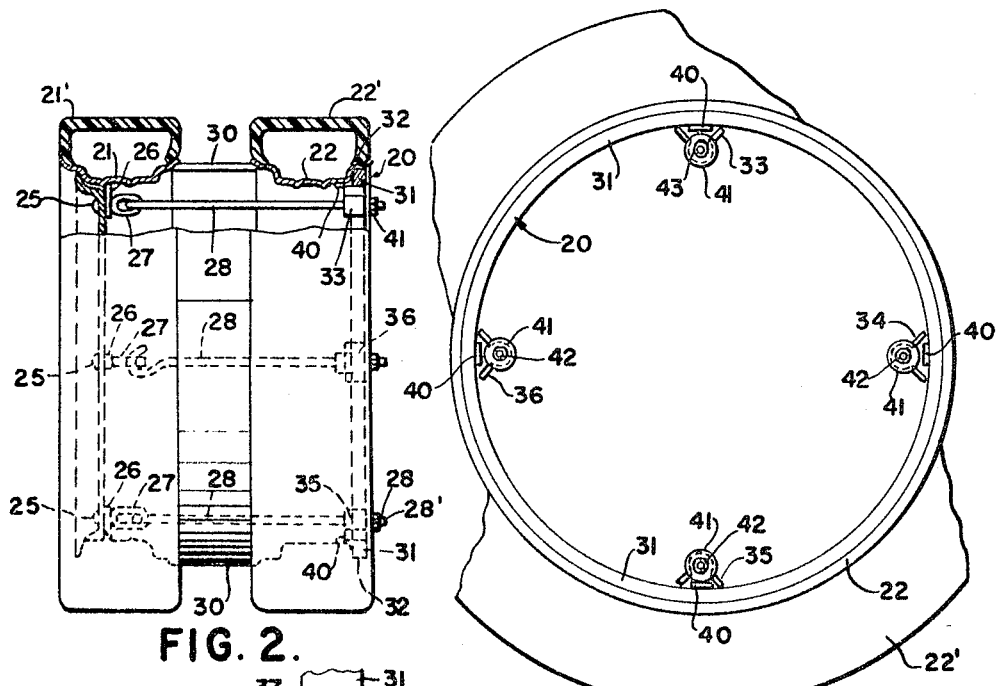
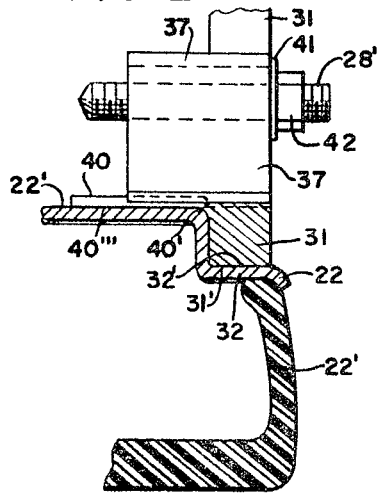
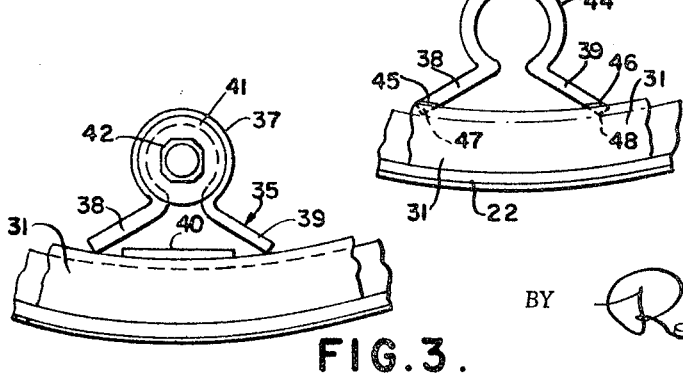
INVENTOR
Melvin O. Johnson
BY *Robert E. Kleve*
ATTORNEY

United States Patent Office 3,464,739
Patented Sept. 2, 1969

3,464,739
DUAL TRACTOR TIRE ATTACHMENT
Melvin O. Johnson, 604 11th Ave. N.,
East Grand Forks, Minn. 56721
Filed May 8, 1967, Ser. No. 636,805
Int. Cl. B60c 17/00
U.S. Cl. 301—39                                                                     2 Claims

ABSTRACT OF THE DISCLOSURE

The invention comprises a dual tractor tire attachment for a tractor having an inner and outer wheel with a spacer therebetween, an annular rod fitted into the annular ridge in the outer wheel, a plurality of rod attachment plates adjacent the inner edge of said annular rod with each plate having a C-shaped center portion and outwardly diverging end flange portions diverging outwardly from the C-shaped portion with portions of the outwardly diverging end flanges fixed to the inner edge of the annular rod and portions of the end flanges extending over the annular inner wall of the outer wheel and adjacent thereto, connecting rod means attached at their one ends to the inner wheel and extending through said C-shaped portions at their other ends and tightened thereto.

---

This invention relates to dual tractor tire apparatus, more particularly, this invention relates to detachable dual tractor tire apparatus.

It is an object of the invention to provide a novel dual tractor tire brace attachment which can be inexpensively made and rapidly attached and detached.

It is a further object of the invention to provide a novel annular rod brace for mounting the tractor tires together which can be wedged securely in place on the rim of the wheel and which has inwardly projecting cylindrical eyelets for attachment of the brace to the wheel.

Further objects and advantages of the invention will become apparent as the description proceeds and when taken in conjunction with the accompanying drawings wherein:

FIGURE 1 is a side elevational view of the dual tractor tire brace attachment invention.

FIGURE 2 is an end view of the dual tractor tire brace invention, with portions of the tires, wheels, spacer and brace broken away to reveal the interior construction.

FIGURE 3 is an enlarged side view of a portion of the annular rod brace, wheel, and one of the cylindrical eyelets.

FIGURE 4 is a cross-sectional view taken along line 4—4 of FIGURE 3.

FIGURE 5 is an end view of a modified form of eyelet and annular brace construction of the invention.

FIGURE 6 is a cross-sectional view taken along line 6—6 of FIGURE 5.

Briefly stated, the invention comprises a pair of tractor wheels and tires having an annular cylindrical spacer therebetween, an annular rod brace wedged into the ridges of the outer wheel and acting as a brace, said annular rod brace having a plurality of eyelet plates mounted at intervals about the annular rod brace, said eyelet plates having a cylindrical center portion for receiving bolts from the inner wheel and having diverging ends welded to the annular rod brace, an inwardly projecting plate projecting toward the inner wheel and abutting the outer wheel.

Referring more particularly to the drawings, in FIGURE 1 the annular rod brace attachment invention 20 for dual tractor tires and wheels is shown operatively installed in a dual tractor tire apparatus which has an inner wheel 21 and an outer wheel 22 having tires 21' and 22', respectively.

The inner wheel 21 is attached to the driving rear axle of a tractor in a manner already known in the art by means of a center plate assembly having an annular center plate 23 mounted coaxially to the rear axle of the tractor. The center plate 23 has a tapered annular flange 23' which abuts a portion 24 of the inner wheel 21. Four bolts 25 pass through the center plate at 90° intervals about the circumference of the plate. The bolts 25 also pass through lugs 26, which lugs abut a portion 26 of the wheel 21 in opposing relation to the portion 24 of the wheel 21. Eyelet nuts 27 are threaded onto the bolts 25 to lock the center plate to the inner wheel. Four rods 28 are hooked at their one ends 29 to the eyelet nuts 27. Between the inner and outer wheel is a cylindrical spacer 30.

An annular rod brace 31 having a square cross-section is wedged into the annular ridge 32 on the outer wheel 22. The annular rod brace 31 has a slightly larger outer circumference along its edge 31' than the ridge along its face 32' so that the rod brace 31 may be wedged securely in the ridge by forcing the rod brace 31 into the ridge thereby compressing the rod brace slightly to accommodate the fit.

Four eyelet plates 33, 34, 35, and 36 are mounted to the annular rod brace 31 at 90 degree intervals to one another. The eyelet plates 33–36 each have a cylindrical center portion 37 with outwardly diverging ends or legs 38 and 39, which legs are welded to the rod brace 31. Between the legs 38 and 39 is an elongated plate 40 which has its one end 40' welded to the annular rod brace 31 with its one face 40" along its other end abutting the face 22' of the outer wheel 22. The outer ends 28' of the rods 28 pass through the cylindrical center portions 37 of the eyelet plates 33–36. Washers 41 are fitted over the outer ends of the rods 28 and nuts 42 are threaded onto the outer ends of the rods to tighten the brace 31, the wheels 21 and 22 and the annular spacer 30 together. The projecting plate 40 prevents the rod brace 31 from twisting or bending in, when tightening the nuts 42, by the plate 39 engaging the face 22'.

In the modified form of the invention, the eyelet plates 44 are similar to eyelet plates 33–36, having the center cylindrical portion 37, and outwardly diverging legs 38 and 39. However the legs 38 and 39 have notched out portions 45 and 46, and the edges 47 and 48 of the legs 38 and 39 abut the inner face 22' of the outer wheel. The eyelet plate 44 is slightly larger than the eyelets 33–36 in a direction along longitudinal axis of the rods 28 and by the edges 47 and 48 abutting the face 22' they serve the same function as the plate 40 by preventing the rod 31 from twisting in when the nuts 42 are tightened. The notched out portions 45 and 46 are welded to the annular rod brace 31.

Thus, it will be seen from the foregoing that a novel inexpensive brace has been provided which has superior strength and is relatively inconspicious when installed on the outer wheel 22 and which can be easily manufactured and rapidly and securely installed and easily detached.

It is obvious that various changes and departures may be made to the invention without departing from the spirit and scope thereof and accordingly, it is not intended that the invention be limited to that specifically described in the specification or as illustrated in the drawings but only as set forth in the appended claims wherein what is claimed is:

1. A dual tractor tire apparatus for a tractor having an inner and outer wheel rims with a spacer therebetween and wherein said outer wheel rim has an annular inner wall with a stepped outward annular ridge, an annular ring fitted into said outer annular ridge of said outer wheel under compression, a plurality of ring attachment plates each having a generally C-shaped center portion with outwardly extending flange portions extending outwardly from the ends of said C-shaped portion, the ends of said outwardly extending flange portions being fixed to the inner edge of said annular ring, said flange portions also having portions extending over and adjacent to said annular inner wall of said outer wheel, said attachment plates being evenly spaced about the inner circumference of said annular ring, connecting rod means having one end attached to the inner wheel and their other end passing through said C-shaped portions, tightening means for tightening the said other ends of the rod means to the C-shaped portions.

2. A dual tractor tire apparatus according to claim 1 wherein said outwardly extending flanges diverge outwardly in opposed relation.

References Cited
UNITED STATES PATENTS

| | | | |
|---|---|---|---|
| 1,327,607 | 1/1920 | Baker | 301—39 X |
| 1,689,968 | 10/1928 | Pounds | 301—36 |
| 3,082,040 | 3/1963 | Degerness | 301—39 |
| 3,237,992 | 3/1966 | Kiesau | 301—39 |
| 3,328,088 | 6/1967 | Olson | 301—39 |

RICHARD J. JOHNSON, Primary Examiner